Patented Aug. 14, 1945

2,382,546

UNITED STATES PATENT OFFICE 2,382,546

ANESTHETIC SOLUTIONS

David Curtis, New York, N. Y.

No Drawing. Application November 3, 1941,
Serial No. 417,712

12 Claims. (Cl. 167—52)

The present invention relates to solvents for water and glycerine insoluble anesthetic and therapeutic compounds, and is a continuation in part of my co-pending application, Serial No. 404,047 filed July 25, 1941, which has issued as Patent No. 2,352,691.

In my said co-pending application, I have described the use of concentrated water and glycerine solutions of procaine salts, and more particularly of procaine acetyl salicylate (Proco-pirin) as solvent vehicles for water insoluble and glycerine insoluble anesthetic bases and salts (based on the theory that "like dissolves like").

The present invention constitutes a further extension and development of the use of procaine salts as solvent media for anesthetic and other substances.

It is an object of the present invention to provide numerous other salts of procaine which, when dissolved, in relatively high concentration, in water or glycerine, or glycol, or the derivatives of glycol will serve as media for the dissolution therein of substances which are otherwise insoluble or sparingly soluble in water, glycerine or glycol or the derivatives of glycol.

It is another object of the present invention to provide new solvent media containing water, or glycerine or glycol or the derivatives of glycerine or glycol for the dissolution therein of derivatives of amino benzene compounds having a sulfonic acid grouping in the benzene nucleus, such as sulfanilic acid amide and its allied group of therapeutic substances.

It is a further object of the present invention to provide a group of new procaine salts which are themselves valuable anesthetic substances and which are also highly suited to serve as solvents for other insoluble sulfonic and carboxylic acid derivatives of amino benzene.

It is a still further object of the present invention to provide new forms of procaine borate in which the components are combined in the proportion of one or two or three molecular equivalents of boric acid to one of procaine base, and which, in glycerine or other polyhydroxy alcohol solutions also constitute desirable solvents for water and glycerine insoluble sulfonic and carboxylic acid derivatives of amino benzene.

It is a further object of the present invention to provide new and useful anesthetic and therapeutic preparations by dissolving relatively insoluble anesthetic and therapeutic substances in procaine salt solutions.

It is a still further object of the present invention to devise new, simple and economical methods for forming procaine salts.

It is a still further object of the present invention to provide methods for producing gauze bandages and other surgical dressings capable of exerting anesthetic and therapeutic and antiseptic effects.

It has been known that a slight amount of an anesthetic base may be shaken, with difficulty, into a relatively dilute solution of an acid reacting salt, such as procaine hydrochloride, for the purpose of buffering the solution to a higher pH, to reduce its acidity. Obviously this result is obtained first, through the normal, though extremely slight solubility of the base itself in water, and secondly, because of the slight acidity of the anesthetic solution itself.

The present invention is entirely outside of the scope of the foregoing. What I have discovered is a method for dissolving insoluble substances of the character described in a solution of a procaine salt in amounts considerably in excess than would be accounted for by the above two factors of normal solubility and slight excess acidity of the solution. My invention consists in the preparation of a solution of a procaine salt in a specific solvent, in sufficient concentration to cause such salt itself to become a solvent for substances otherwise insoluble or of limited solubility in that specific solvent.

Whereas, in the buffering example cited above, it is evident that the insoluble base goes into solution because of the slight acidity of the procaine salt, in the preparations of the present invention the solubility of the insoluble substance takes place in the base fraction of the soluble procaine salt. This will be evident from the fact that I can effect the solubilities of the insoluble substances in a procaine salt that is itself alkaline in reaction, such as when the procaine is linked to boric acid or to an organic acid, or, furthermore, when I dissolve procaine base in a procaine hydrochloride solution in an amount considerably in excess than is necessary to merely shift the pH to the alkaline side.

As the solvent salt which is to be dissolved in water or glycerine or the other named vehicles to form the vehicle for the substances which are themselves either insoluble or of limited solubility, any soluble salt of procaine may be used; the more readily soluble salts of procaine being, of course, preferable for the purpose.

As further indicated in my co-pending application, not all procaine salts have the same solubilizing effect, and different salts of procaine can carry in solution different quantities of a particular substance. However, the common characteristic of all such procaine salts in aqueous or glycerine or other named solution is that such solutions can carry a greater quantity of the insoluble substance than the volume of water or glycerine or other liquid medium in the solutions would themselves carry or even than the total solution volume, including the increment resulting from the dissolution of the procaine salt could carry if such volume were wholly water or glycerine or the like.

Another common characteristic of all procaine salt solutions of the character described is that when any part of the insoluble material dissolved therein should precipitate out, it can be readily redissolvel through the simple expedient of warming of the solution.

As a general principle, a procaine salt tends to have a greater solubilizing effect upon insoluble substances outlined herein, when the acid radicle of the salt is of such a nature that it in itself, because of certain chemical characteristics, has greater solvent properties. Such acid radicles are those which are themselves of an ester nature, such as aspirin, for example; or of a ketonic nature, such as levulinic acid, or pyruvic acid, for example, or of an alcoholic nature such as the carbohydrate acids, of which the aldonic acids are examples.

As examples of different procaine salts that can be used as a basis for a solvent for the insoluble substances of the present invention, the following may be listed: procaine hydrochloride, procaine phosphate, mono and di-procaine sulphate, procaine borate (from 1:1 to 1:5 base to acid) mono-, di- and tri-procaine citrate, mono and di-procaine tartrate, mono and di-procaine malate and procaine salts formed by linking the base to the fused forms of the last three acids, procaine butyrate and iso-butyrate, procaine acetate and phenyl-acetate, procaine-phenyl-butyl-acetate, procaine glucono-phosphate, procaine-bromo-acetate, procaine glycerate, procaine glycolate, procaine-glycero-phosphate, the procaine aldonates and the procaine aldonyls and their salts, procain levulinate, procaine pyruvate, procaine acetyl salicylate and procaine salicylate, procaine lactate, procaine cinnamate, procaine hydrocinnamate ($C_6H_5CH_2.CH_2COOH$-procaine beta-phenyl-propionate) and other saturated and addition products of cinnamic acid salts of procaine, such as the addition product formed when cinnamic acid unites with hydrochloric, hydrobromic and hydriodic acids, respectively. (Example: $C_6H_5.CH:CH.COOH$ plus $HCl = C_6H_5CHCl.CH_2.COOH$ beta - phenyl-beta-chlor propionic acid); bromine, chlorine and iodine also yield addition products with cinnamic acid (Example: $C_6H_5.CH:CH.COOH$ plus $Br_2 = C_6H_5.CHBr.CHBr.COOH$ - beta phenyl-di-bromo propionic acid).

Cinnamic acid being an unsaturated acid yields addition products with halogen hydrides, hypochlorous acid, $SO_2$ bromine, etc., and procaine salts may be formed by combining procaine base with such saturated forms of cinnamic acid.

Glycerine and water and other named solutions of the above and other procaine salts may serve as solvent vehicles for other valuable anesthetic and therapeutic antiseptic substances, to obtain preparations of such anesthetics and therapeutic antiseptic substances which are new and which have many new applications and uses in the medical arts.

As examples of the anesthetic bases and salts that may be dissolved in a procaine salt solution of the character described, the following may be cited:

Procaine base, butyn base and its salts, benzocaine, propoesin, butesin, orthoform (methyl-metamino-para-oxybenzoate)

and their salts, inorganic and organic, such as benzocaine hydrochloride, benzocaine sulphate (mono- and di-), benzocaine citrate, benzocaine tartrate, benzocaine malate in all their available forms, benzocaine gluconate, and other salts of benzocaine and aldonic acids, as well as gluconyl and other aldonyl benzocaine compounds and their salts, benzocaine salicylate, benzocaine acetyl-salicylate, benzocaine borate (1–5 moles of boric acid combinations with benzocaine base compounded in media wherein the boric acid undergoes considerable to complete dissociation, such as in glycerine, polyhydroxy carbohydrates, mannitol, dulcitol, etc., as well as in the presence of poly-hydroxy carbohydrate acids, such as gluconic acids and other aldonic acids; pyruvic acid, levulinic acid as well as in the presence of polybasic aliphatic acids, tartaric, citric and malic); benzocaine pyruvate; benzocaine levulinate (acetyl—propionate); benzocaine cinnamate; benzocaine hydrocinnamate (beta-phenyl propionate); benzocaine beta-phenyl chlor-propionate benzocaine beta-phenyl ($a$-$b$) bromo-propionate; benzocaine beta phenyl iodo-propionate; benzocaine sulphanilate; benzocaine aromatic sulphonates, etc. The other anesthetic bases named above may also be linked to the same acids as enumerated in the benzocaine list and used for the purposes of this invention.

In addition to the sulfonic and carboxylic derivatives of amino benzene, I find that it is possible to dissolve other aromatic substances in procaine salt solutions of the character described such as salicylic acid, salicylamide, epinephrine base and other vaso-constrictor bases, thymol cresol, mono-chlorthymol eucupin and others. Certain aliphatic substances of limited solubility in water may also be dissolved in an aqueous solution of a procaine salt, such as chlorbutanol, etc.; also eugenol, iso eugenol, their ethers and the like. I believe that the solvent action of procaine salt on such substances is due to the chemical nature of procaine as an ester, and consequently, having the property of a solvent, as well as to the ammoniacal nature of procaine base, due to its two amino groupings.

In accordance with the present invention, by which substances insoluble in a specific medium may be brought into solution in such medium in the presence of a soluble procaine salt, in amounts exceeding their limited normal solubilities in such media, many valuable anesthetic and therapeutic antiseptic preparations may be prepared.

Thus I can obtain relatively strong solutions of benzocaine and other anesthetic bases and salts in a medium containing water or glycerine, or both, and obtain preparations which are suitable for both local and surface anesthesia or for the saturation of gauze bandages or other surgical fabrics used for dressings, or the like.

The desirability of obtaining a benzocaine solution in a non-corrosive, inert, liquid medium can be readily appreciated and has been expressed in the literature. Thus Dr. S. Gordon in his book "Dental Science and Dental Art" (Lea & Religer, Phila. 1938), in the chapter on local and surface anesthetics, expressed the desirability of someone finding a method of dissolving benzocaine in glycerine. Applicant has gone further and has also found a method for dissolving it in water.

As examples of such benzocaine and other solutions, the following may be cited:

*Example No. 1.*—15 gms. of procaine hydrochloride equiv. to (12.99 gms. of base) are dissolved in 10 cc. of water, making a total volume of about 25 cc. In this solution 5 gms. of procaine base are dissolved. The resultant solution remains clear for quite some time, and is a potent surface anesthetic, and may be regarded as substantially stable.

Considering that the normal solubility of procaine base in water is only 0.2% (0.05 gm. to 25 cc. of $H_2O$) and that in the foregoing example 70 times as much is dissolved (even regarding the final volume of 29 cc. as the vehicle) the importance of the present invention can be appreciated.

*Example No. 2.*—Into a solution of 15 gms. of procaine hydrochloride in 10 cc. of water, 0.1 gm. of benzaldehyde sodium bisulphite is stirred in. When solution is complete, 2 gms. of orthoform and then 2.14 gms. of delta-glucono lactone are dissolved in it, by warming, forming orthoform gluconate in solution. In the resulting solution 0.06 gm. of epinephrine bitartrate is dissolved. The benzaldehyde sodium bisulphite is used as an anti-oxidant, which I have found to be superior in solutions of procaine and epinephrine or other vaso-constrictors, to other anti-oxidants, especially to the commonly used sodium bisulphite, because of the high efficiency of the benzaldehyde sodium bisulphite as an anti-oxidant.

Instead of orthoform gluconate, benzocaine gluconate may be used.

*Example No. 3.*—Into a solution of 30 gms. of procaine hydrochloride, in 70 cc. of water, 0.5 gm. of benzocaine is stirred in and dissolved on warming. The resulting solution is acid to litmus.

*Example No. 4.*—Into a solution of 15 gms. of procaine hydrochloride in 10 cc. of water 2 gms. of benzocaine are stirred in, while warming. The solution remains clear for hours.

*Example No. 5.*—To the solution of Example I, consisting of 15 gms. of procaine hydrochloride, 10 cc. of water and 5 gms. of procaine base, between 2 and 4 gms. of benzocaine base can be stirred in. The resulting solution remains clear for a few days.

As examples of preparations with more efficacious procaine salt solvents the following representative preparations may be cited:

*Example No. 6.*—In 22.915 gms. of procaine acetyl salycilate (which I call Proco-pirin) dissolved in 10 cc. of water (which salt can easily be formed from the reactant substances—13 gms. procaine base and 9.915 gms. aspirin in the volume of water employed), 4 gms. of benzocaine are dissolved by warming. The solution formed is substantially stable and is of definitely greater stability than when a similar amount of benzocaine is dissolved in a solution of 15 gms. of procaine hydrochloride, containing the equivalent of 13 gms. of base, in 10 cc. water. (The term stability is herein used in the sense of freedom from precipitation.)

It may here be noted that the normal solubility of benzocaine base in water is only about 1:3500.

*Example No. 7.*—In 12.48 gms. of procaine acetyl salycilate dissolved in 10 cc. water, 2 gms. of benzocaine cinnamate are stirred in and dissolved by warming.

The preparations of the foregoing examples are highly desirable for use as surface anesthetics, and when used judiciously and in moderation may also be used as local anesthetics.

When a product of a heavier specific gravity is desired, the ingredients of the above examples as well as of those given below may be dissolved in glycerine, or the water solutions may suitably be diluted with glycerine. This is of importance since the water insoluble anesthetics and other substances are also of a limited solubility in glycerine. Such glycerine containing solutions may be additionally diluted with a volatile solvent, such as acetone or alcohol or the like, for the purpose of impregnating gauze bandages and other dressings; the volatile vehicle being thereafter evaporated, leaving the fabric thoroughly impregnated with the active ingredients.

All the solutions of the examples given herein may also be diluted with glycol, propylene glycol; mono-ethyl ether of diethylene glycol, and other glycol derivatives, and with glycerine derivatives such as glyceryl-alpha-mono-ethyl or mono methyl ether or other suitable glycerine ethers.

The ingredients of the above examples as well as of those following may likewise be dissolved in the glycol or in the glycol derivatives named above.

*Example No. 8.*—In a solution of 15 gms. of procaine hydrochloride in 10 cc. of water, 3.4 gms. of salicyclic acid are dissolved by warming. The resulting solution can be used to form benzocaine salycilate by adding to it an equimolecular proportion (4 gms.) of benzocaine base, the resulting salicylate of benzocaine going into solution.

Since the union of benzocaine with salicylic acid is a weak one, the compound will exert the action of salicylic acid and the preparation may, therefore, be used for the same purposes as salicylic acid is used, such as: as an antipruritic, for wounds, skin diseases, destruction of corneous growths, warts, and other such tissues, with the additional advantage of the anesthetic effects of the other ingredients, to minimize the pain and discomfort incidental to such operations.

*Example No. 9.*—4 gms. of benzocaine base are dissolved in a solution of 15 gms. of procaine hydrochloride in 10 cc. of water. When 10 gms. of acetamide ($CH_3CO.NH_2$) are added, the solution will remain clear for a longer time.

*Example No. 10.*—4 gms. of benzocaine are dissolved in a solution of 15 gms. of procaine hydrochloride in 10 cc. of water. Separately 10 gms. of acetamide are dissolved in 15 cc. of water and in the latter solution 4.5 gms. of aspirin are dissolved (solution takes place easily and rapidly). The two solutions are mixed and remain clear for a relatively long time.

*Example No. 11.*—4 gms. of benzocaine are dissolved in a solution of 15 gms. of procaine hydrochloride in 10 cc. of water. Into this solution is stirred in a separate solution of 10 gms. of potassium citrate in 10 cc. of water in which 4 gms. of aspirin have been dissolved. The mixing of the solutions takes place easily.

*Example No. 12.*—15 gms. of procaine hydrochloride are dissolved in 10 cc. of water and 2 gms. of benzocaine dissolved in it and the solution diluted to 50 cc. with glycerine. The final solution will remain clear for a clinical day. Any subsequent separation of benzocaine may be easily cleared by warming.

*Example No. 13.*—13 gms. of procaine base and an equimolecular proportion (6.4 gms. may be used) of levulinic acid ($CH_3CO.CH_2.CH_2COOH$) are dissolved in 10 cc. of water forming procaine levulinate. 4 gms. of benzocaine are stirred in and solution takes place easily. The resulting preparation remains clear longer than a similar solution with procaine hydrochloride and constitutes a highly potent local and surface anesthetic. As in the case of aspirin, levulinic acid contains an acetyl group which adds to its potency, and its greater solubilizing effect may be ascribed to the ketonic nature of levulinic acid.

Pyruvic acid ($CH_3CO.CH_2COOH$) may likewise be used in place of the levulinic acid.

If desired, procaine levulinate or procaine pyruvate may be first prepared by dissolving equimolecular proportions of procaine base and the desired ketonic acid in acetone and evaporating off the volatile vehicle. Procaine levulinate is a syrupy mass, easily soluble in water, alcohol, glycerine and other organic solvents.

*Example No. 14.*—9.8 gms. of delta-glucono-lactone are dissolved in 10 cc. of water and boiled and 13 gms. of procaine base stirred in while the solution is hot until solution is complete. 2 to 4 gms. of benzocaine can be stirred in and dissolved in the resulting solution. The final solution will remain clear for several hours and may be rendered clear again on warming.

*Example No. 14a.*—Instead of dissolving benzocaine base in the procaine salt solution of Example 14, equimolecular proportions of benzocaine and delta-glucono lactone, as an example, in the amounts of 1.65 gms. of benzocaine and 1.78 gms. delta glucono lactone, or other suitable quantities may be dissolved, and the resultant solution may be diluted to 1000 cc. with water containing 0.5% of chloroetone. A highly potent local anesthetic is obtained with the further addition to the solution of other requisite ingredients for this type of an anesthetic; namely, NaCl to constitute 0.66% of the solution, and about 1:60,000, or 1:30,000 of epinephrine bitartrate (as base) and, as suitable antioxidants, 0.05%–0.1% of benzaldehyde sodium bisulphite and 0.11% of sodium thiosulphate, anhydrous. Instead of epinephrine a suitable epinephrine substitute may be used, such as neo-synephrine HCl in the amount of 3 parts to 10,000 parts of the solution.

The above illustrates a highly important feature of this invention, namely, the method of compounding suitable salts of benzocaine, or of other alkyl-para-amino benzoic acid esters by dissolving the anesthetic base and the requisite acid in suitable proportions in the concentrated procaine salt solutions. Such compoundings of these generally insoluble in water benzocaine salts and the like obviates the separate preparations in volatile vehicles, with the subsequent necessary evaporations of these volatile media. Potent surface anesthetics and, upon proper dilution, local anesthetics ready for immediate use may thus be obtained. All the necessary ingredients may be compounded in concentrated formulation, and which may be needed for the particular purpose.

Into the delta-glucono lactone preparation as of the example No. 14 illustrated above, I stir in 10 gms. of thymol and, upon warming, it goes into solution.

*Example No. 15.*—A more stable variation of Example 14 may be prepared by first dissolving in the aqueous condensation of procaine and gluconic acid additional 5 gms. of procaine base and then stirring in 2 gms. of benzocaine base. The resulting product is a highly potent anesthetic and is a highly viscous balsamic mass which clings to an instrument and may thus be conveyed direct into a wound or site of operation on an instrument.

The foregoing preparation is especially suitable, because of its viscous nature, for impregnating gauze bandages and other dressings by previously diluting with glycerine and then more extensively with a volatile vehicle and driving off the volatile vehicle after impregnation. It is also suitable for mixing with lanolin for use as an ointment.

*Example No. 15a.*—In 10 cc. of $H_2O$ I dissolve 6.4 gms. of levulinic acid plus 13 gms. of procaine base. When dissolved I stir in 5 more gms. of procaine base. I then stir in 5 gms. of thymol and five gms. of benzocaine and upon warming the solution becomes clear.

Epinephrine 0.05 gm. plus 0.1 gm. of benzaldehyde sodium bisulfite may be stirred in and dissolved. We here have an example where a procaine salt solution, a levulinate is capable of dissolving more base and also benzocaine base and thymol.

*Example No. 16.*—Into a solution of the condensation product of 13 gms. procaine base and 10 gms. of delta-glucono-lactone in 10 cc. of water, an additional 5 gms. of procaine base are dissolved by stirring and gently heating. 2 gms. of benzocaine base are then dissolved in the solution, also by warming; 0.1 gm. of benzaldehyde sodium bisulphite is then stirred in and dissolved, followed by 0.075 gm. of epinephrine bitartrate, and dissolved by warming.

The preparation is a highly potent anesthetic which, when applied to a bleeding small wound in the skin for several minutes, establishes profound anesthesia.

10 gms. of thymol may be liquefied and dissolved, on warming, in the solution of Example 16. This forms a valuable preparation in minimizing the discomfort incident to dental cavity preparations.

*Example No. 17.*—9.8 gms. of delta-glucone lactone and 2 gms. of boric acid, are dissolved in 10 cc. of water and the solution brought to a boil. The boric acid dissolves in this small volume of water in the presence of gluconic acid, since there is a lowering of the PH and since, gluconic acid, being a polyhydroxy carbohydrate acid, it renders boric acid more soluble in water (J. Boeseken et al.—Rec. Trav. Chim. v. 37, pp. 165–78, 1918). The dissolved boric acid, in turn, facilitates the opening up of the lactone ring and aids the condensation of the procaine glucono-lactone compound. Into this hot solution 13 gms. of procaine base are stirred in until the solution is clear. Additional 5 gms. of procaine base are then stirred in. The solution may be diluted with glycerine.

*Example No. 18.*—The same amounts of the delta-glucono lactone and procaine base as in the last foregoing example, may be dissolved and combined in 75 cc. of glycerine, and 4 gms. of benzocaine may be added. A potent anesthetic solution which remains clear long enough to be used for clinical purposes as well as for gauze saturation is obtained.

Gamma galactono-lactone may be used in place of the delta-glucono lactone. Solution takes place somewhat slower.

*Example No. 19.*—15 gms. of procaine hydrochloride are dissolved in 10 cc. of glycerine. 2 gms. of benzocaine are stirred into the solution and on warming dissolve very easily.

*Example No. 20.*—13 gms. of procaine base and 9.915 gms. of aspirin are dissolved in 20 cc. of glycerine and 4 gms. of benzocaine stirred in. Solution takes place easily.

*Example No. 21.*—13 gms. of procaine base and 6.4 gms. of levulinic acid are dissolved in 25 cc. of glycerine. 6 gms. of benzocaine base are stirred in, and dissolved easily on heating. The final solution remains clear for several days. Any subsequent precipitation can be cleared up by warming.

*Example No. 22.*—10 gms. of delta-glucono lactone and 13 gms. of procaine base are condensed in 40 cc. of glycerine by heating. 5 gms. of procaine base are then stirred in and when dissolved 2 gms. of benzocaine are added and dissolved.

If desired, the condensation product of benzocaine with delta glucono lactone, separately formed in hot glycerine, may be added in place of the benzocaine base.

Another valuable group of substances for the purposes of this invention is procaine borate and particularly the series of new procaine borate compounds which I have discovered, in which compounds the boric acid is caused to dissociate to a considerably greater degree than normal through the presence of any of several kinds of polyhydroxy organic acids, both monobasic, as well as polybasic, as well as in the presence of various polyhydroxy alcohols, such as mannitol, glycerol, sorbitol, dulcitol and the like, also carbohydrates like dextrose, levulose and the like, having aldehydric or ketonic groups in their structures.

It is known that a greater degree of dissociation of boric acid may be secured through the presence of substances such as those enumerated above and that such increase of the H ion concentration of a mixture of such substances with boric acid is attributed to the formation of complex highly ionizable substances. (E. Rimbach & P. Ley Z. Physikal. Chem. 1922. 100, pp. 393–407.) Acids enumerated are glycolic, lactic, citric, malic and tartaric. Also J. Boeseken, et al.—Rec. Trav. Chim. 1918, v. 37. pp. 165–183, listing also tartaric-racemic, glyceric and gluconic acids. Also J. Boeseken et al.—Proc. K. Akad. Wetensch. Amsterdam, 1916, vol. 18, pp. 1647–53; citing the following polyhydroxy compounds as also increasing the H ion concentration of boric acid solutions with an increase in the conductivity of such solutions; mannitol, lactic acid as well as some of the aromatic alcohols, catechol, hydroxyquinol, pyrogallol. Magnanini-A., 1890, p. 1357; 1891, p. 251, cites mannitol and dulcitol as increasing the conductivity of boric acid. J. Boeseken et al. Rec. Trav. Chim. 1911, v. 30 pp. 392–406, cites glycerol, pentaerythritol, catechol and pyrogallol as increasing the molecular conductivity of boric acid and show that the two hydroxyl groups of such polyhydroxy compounds should be not only in the alpha or ortho position to one another but should be in the same plane, thus permitting the formation of ring combinations with boric acid. E. B. R. Prideau-Zeitsch. Anorg. Chem. 1913, v. 83 pp. 362–68, shows that boric acid may be titrated with the addition of glycerol or mannitol. Z. Anong-Aelgem. Chem. v. 142, pp. 83–110 (1925)-boric acid readily forms esters with mono and polyhydroxy alcohols with increasing acidity and conductivity. He cites salicylic acid and boric acid as forming a strong acid. Ukraine. Klin. Zhur. v. 11, pp. 433–44, 444–5, in German, 1936, cites dulcitol, mannose, xylose and arabinose as increasing the degree of dissociation of boric acid. Same publication v. 8. pp. 307–15 (1933) cites fructose to be as good as mannitol in increasing dissociation of boric acid and maltose, lactose, glucose, erythritol and galactose increasing ionization of boric acid, in the order given, but having a lesser effect than fructose or mannitol; two moles of mannitol per one mole of $H_3BO_3$ producing the magnitude of the effect.

*Example No. 23.*—20 gms. of procaine borate (1 mole procaine base to 5 moles of boric acid) are dissolved in 10 cc. of water and 1 to 2 gms. of benzocaine base stirred in. Solutions take place easily.

*Example No. 24.*—In 25 cc. of glycerine 5 gms. of boric acid are dissolved by heating. 19 gms. of procaine base are then stirred in. Although such amount of procaine base is itself insoluble in glycerine, a clear solution is formed in the presence of the boric acid, showing that an equimolecular procaine borate salt is formed. In this solution 2 gms. of benzocaine can be stirred in and dissolved, on warming, to form a powerful anesthetic preparation which remains clear for at least a number of days. When in such a solution additional 2 gms. of benzocaine are dissolved by warming, it will still stay clear for a full clinical day.

*Example No. 25.*—If desired, the 5 gms. of boric acid and the 19 gms. of procaine base are first dissolved and combined in alcohol or acetone by warming on the water bath. The volatile solvent is then driven off, and the equimolar procaine borate, a white, hard mass, is then easily dissolved in 50 cc. of glycerine. The 2 gms. of benzocaine may then be dissolved in the glycerine solution.

*Example No. 26.*—10.8 gms. of levlulose and 3.72 gms. of boric acid are dissolved in 75 cc. of acetone plus 50 cc. of water and 7.08 gms. of procaine base stirred in. The solution is taken down to dryness and the crystalline residue is dissolved in 20 cc. of water and in the aqueous solution 1 gm. of benzocaine may be dissolved. The procaine borate compound contains here a di-molar equivalent of boric acid.

*Example No. 27.*—21 gms. of mannitol are dissolved in 50 cc. of water and in this solution 3.72 gms. of boric acid are dissolved. This represents two moles mannitol to 1 mole of boric acid. An amount of procaine base equimolecular to the amount of boric acid, namely, 13 gms. are stirred in and dissolved, by warming. 1 gm. of benzocaine is stirred in, which dissolves on warming. A unimolar compound of mannitol and boric acid may also be formed.

*Example No. 28.*—In 10 gms. of mannitol dissolved in 65 cc. of water, 10 gms. of boric acid are dissolved, on heating, 15 gms. of procaine base are then stirred in and dissolved and the solution diluted to 100 cc. When made up to a concentration of 2% procaine base, by diluting 13.3 cc. of the above solution to 100 cc. with water, the solution has a pH of 7.5, brom-thymol blue. A half a gm. of benzocaine sulphosalicylate may be dissolved in the above 10 cc. of the original 15% procaine base solution.

*Example No. 29.*—20 gms. of boric acid and 34 gms. of mannitol are dissolved in 150 to 200 cc.

of acetone containing 5% water, on the water bath. Since neither boric acid nor mannitol are soluble in acetone, to any great extent, the formation of a compound is clearly indicated. When solution is complete, 38 gms. of procaine base are stirred into it. Upon evaporating to dryness, a glassy, crystalline mass is obtained. This mass may be taken up in 75 cc. of water and 50 cc. of propylene glycol. Into this aqueous propylene glycol solution 5 gms. of benzocaine are stirred in. The final product contains approximately 40% by weight of mannitol procaine borate and approximately 2% by weight of benzocaine. A very powerful surface anesthetic is thus obtained. The benzocaine may be dissolved in the aqueous solution prior to the addition of the propylene glycol. In addition to the benzocaine 2 gms. of aspirin may be stirred in.

The above proves the great dissociation of the boric acid-mannitol compound in water, with the consequent linkage of a higher proportion of procaine base than is present in the compound of a 5 molar equivalent of boric acid to one mole of procaine base, and also that the insoluble benzocaine could be dissolved in such procaine solution.

*Example No. 30.*—21.616 gms. of levulose are dissolved in 50 cc. of water and 3.72 gms. of boric acid stirred in and dissolved. This represents two moles of levulose to 1 mole of boric acid. The boric acid in this mixture dissociates enough to combine, equimolecularly, with procaine base (14.16 gms.) of which may be stirred in and warmed until solution is complete. In this solution ½ gm. of benzocaine may be dissolved, followed by 1 gm. of boric acid.

*Example No. 31.*—5 gms. of boric acid and 19 gms. of procaine base are dissolved in 25 cc. of glycerine and when solution is completed, 3 gms. of orthoform-new (meta-amino-para-hydroxy benzoic acid methyl ester

are stirred in and dissolved.

*Example No. 32.*—6.4 gms. of levulinic acid and 13 gms. of procaine base are dissolved in 50 to 75 cc. of acetone and separately, in 15 cc. of acetone, 1.48 gms. of cinnamic acid and 1.65 gms. of benzocaine base are dissolved. The two solutions are mixed and the acetone removed. The remaining material presents a liquid mass; the benzocaine cinnamate being completely dissolved in the procaine levulinate. (Procaine levulinate itself is a syrupy mass.) The material may be taken up in 20 cc. of water in which it dissolves very easily. When diluted to 100 cc. the solution still remains clear. Only when diluted to about 150 cc. a precipitate of benzocaine cinnamate begins to form, which can be cleared up by heating. Diluted to 1000 cc. and warmed it clears again. The solution is acid to litmus.

*Example No. 33.*—The ingredients of Example 32 are directly brought together in 10 cc. of water, by first dissolving the levulinic acid and the procaine base and then adding the benzocaine and following it with the cinnamic acid. To this solution 20 cc. of epinephrine cinnamate are added. (Made by combining 0.183 gm. of epinephrine base plus 0.150 gm. of cinnamic acid in 15 cc. of H₂O, diluted to 180 cc. with water and containing 0.1 gm. of benzaldehyde sodium bisulphite). The complete solution may be diluted to 1000 cc., to form a 2% solution of procaine levulinate and 0.313% of benzocaine cinnamate. The solution forms a very potent local anesthetic which also has inherent vaso-constrictive properties because of the presence of benzocaine. 2 gms. of sodium thiosulphate, crystalline may be added for longer preservation, plus 0.5 gm. of benzaldehyde sodium bisulphite.

*Example No. 34.*—2 gms. of boric acid and 6.4 gms. of levulinic acid are dissolved in 10 cc. of water. 13 gms. of procaine base are then dissolved in this solution and 5.4 gms. of orthoform-new, (which is in equimolecular proportion to the amount of boric acid dissolved) producing orthoform borate in this solution. Benzocaine borate may likewise be formed in this manner.

*Example No. 35.*—In 19.4 gms. of procaine levulinate dissolved in 10 cc. of H₂O 5.4 gms. of orthoform-new are dissolved by warming, and stirring. When dissolved, the equivalent of cinnamic acid, 4.8–5.0 gms. are stirred in, forming orthoform-cinnamate.

*Example No. 36.*—In 25 cc. of glycerine containing, in solution, 1.9612 gms. of phosphoric acid (2.307 gm. of 85% H₃PO₄ Sp. Gr. 1.710), 9.44 gms. of procaine base are dissolved, forming diprocaine phosphate. One gm. of benzocaine base is then dissolved in this solution. The solution remains clear for many days.

I also found that among other substances that may dissolve in a strong solution of a procaine salt is epinephrine base. Epinephrine base may likewise be dissolved in a solution of a procaine salt in which an excess of procaine base has been dissolved, thus proving that there need be no slight excess of acidity of the solution, nor that the solution need even be of acid reaction for epinephrine base to dissolve in it.

Thus, in a solution of 15 gms. of procaine HCl in 10 cc. of water, 5 gms. of procaine base may be dissolved. 0.1 gm. of benzaldehyde sodium bisulphite may be present, or other suitable antioxidants. 0.1 gm. of epinephrine base may be added and stirred until dissolved. Epinephrine salts may of course also be used in making up such a preparation. A suitable powder can be compounded containing the requisite ingredients to be used to make up a complete solution, ready for immediate use, or the powder may be compounded to be made into tablets of suitable size. Thus 150 gms. of procaine HCl may be mixed with 50 gms. of procaine base. Epinephrine base or a suitable salt of epinephrine may be added in the amount required, so as to make the final solution from about 1:30,000 to about 1:1000 concentration or weaker, or stronger, as the case may be. Sodium thiosulphate, anhydrous, sodium sulphite, sodium bisulphite, or benzaldehyde sodium bisulphite may be added, as anti-oxidants.

If the 150 gms. of procaine HCl and 50 gms. of procaine base are to be dissolved in 100 cc. of H₂O, the final volume will be about 300 cc. If the solution is to be of a 1:1000 concentration of epinephrine base, 0.3 gm. of epinephrine base are added, or the equivalent, if used in the form of a salt. Thus, 0.546 gm. of epinephrine bitartrate may be used; 0.5 gm. of sodium thiosulphate (anhydrous) and 0.15 gm. of sodium bisulphite, or 0.15 gm. of benzaldehyde sodium bisulphite may be incorporated into the powder. If the powder is to be stamped out into tablets, a suitable binder, such as dextrine, or mannitol or the like may be added.

Other salts of procaine enumerated in these specifications may be similarly employed to make up the complete mixture of the ingredients, with the addition of benzocaine, any of its salts, or any of the other alkyl amino benzoate anesthetics insoluble in water, or in glycerine, as outlined in this specification.

Such powder may be dissolved in a sufficient volume of water to dissolve all of the ingredients of the perfected mixture and have ready for use, or the powdered ingredients, in full combination, may be employed for the stamping out of tablets of suitable size.

*Example No. 37.*—In 5 cc. of water 4.5 gms. of b-phenylpropionic acid are treated with the equimolecular amount of 7.08 gms. of procaine base. The mixture may be stirred in and warmed until solution is complete with the formation of procaine b-phenylpropionate. 0.5 gm. of benzocaine base may now be dissolved in this solution, followed by the addition and solution of 0.455 gm. or more of b-phenyl-propionic acid, thus forming benzocaine b-phenyl propionate.

*Example No. 38.*—In 25 cc. of glycerine 4.2022 gms. of citric acid (1 $H_2O$ of crystallization) and 14.16 gms of procaine base are dissolved with the formation of tri-procaine citrate. 0.1 gm. of benzaldehyde sodium bisulphite is added and 0.3 gm. of sodium thiosulphate, anhydrous, and 0.03 gm. of epinephrine bitartrate, or more, if required, are then stirred in, and dissolved. An additional 5 gms. of procaine base may be stirred in and dissolved followed by 1 gm. of benzocaine base.

*Example No. 39.*—7.4 gms. of cinnamic acid are dissolved and condensed simultaneously with 11.8 gms. of its equivalent amount of procaine base in 10 cc. of water to form procaine cinnamate on heating and stirring. 1 gm. of benzocaine base is then dissolved in this solution followed by the addition of 0.910 gm. of b-phenyl-propionic acid. The solution remains clear for many days. There may also be stirred in 0.05 gm. of benzaldehyde sodium bisulphite, plus 0.2 gm. of sodium thiosulphate, crystalline, or anhydrous. 0.03 gm. of epinephrine base may then be stirred in which dissolves easily. Any suitable epinephrine salt, or any epinephrine substitute may be used. The cinnamic acid employed as per these specifications also may include condensation products of cinnamic acid and tartaric acid, produced by fusions of these acids. Linkages of procaine, epinephrine base, and anesthetics may be obtained with such fusion products.

*Example No. 40.*—In 10 cc. of an aqueous 30% solution of procaine hydrochloride, 2 gms. of procaine base are dissolved on warming to about 125° F. 1 gm. of benzocaine base is then dissolved in this solution, which is alkaline to litmus papers, indicating that the benzocaine certainly has no more acid substance to attach itself to, and goes into solution on the "like dissolves like" principle, and possibly because of the ester nature of the procaine radicle and because of its ammoniacal nature, as was explained earlier.

*Example No. 41.*—In 50 cc. of propylene glycol, 15 gms. of procaine HCl are dissolved and 10 gms. of benzocaine stirred in. The solution takes place at a temperature of 120–140° F. The solution remains clear on next day. A similar solution without any procaine HCl soon showed precipitation.

Not only anesthetic bases and salts of the alkyl and alkamine para-amino benzoate group may be dissolved in a solvent of a procaine salt in water or glycerine or the like, but other aromatic substances having a nuclear amino grouping in their structure may similarly be dissolved. Thus, I have discovered the important fact of effecting such a solution of sulfanilamide ($C_6H_4NH_2.SO_2.NH_2$ para-amino-benzene-sulfonamide having a nuclear $NH_2$ group in the para position with respect to the $SO_2NH_2$ grouping), and its related antiseptic drugs, such as sulfanilic acid (para-aniline-sulfonic acid), sulfapyridine 2-(p-amino benzene sulfonamido) pyridine, sulfathiazole-(2-sulfanilyl-aminothiazole) and sulfadiazine.

*Example No. 42.*—In a solution of 15 gms. of procaine hydrochloride in 10 cc. of water, 2 gms. of sulfanilamide are dissolved, forming a substantially permanent solution which stands up clear for at least two months.

*Example No. 43.*—To the solution of Example 42, 5 gms. of procaine base may be added and a clear solution is formed.

*Example No. 44.*—3 gms. of sulfanilamide may be dissolved in a solution of 19.4 gms. of procaine levulinate in 10 cc. of water. This solution is also substantially stable. The total volume is 29 cc., making it a 10.3% solution of sulfanilamide in water. Normal solubility in water is about 0.8%.)

*Example No. 45.*—In the final solution of Example 44, 4 gms. of benzocaine may be dissolved.

*Example No. 46.*—In the final solution of Example 45 an additional 5 gms. of procaine base may be dissolved, to render the solution more stable with respect to the benzocaine.

*Example No. 47.*—In a solution of 15 gms. of procaine hydrochloride in 10 cc. of water, 2 gms. of sulfanilic acid (only slightly soluble in water) may be dissolved by stirring and heating. 1 gm. of benzocaine may then be stirred in, dissolving easily, forming benzocaine sulfanilate.

*Example No. 48.*—In a solution of 15 gms. of procaine hydrochloride in 10 cc. of water, 10 cc. of aniline ($C_6H_5.NH_2$) are dissolved; aniline being useful medicinally as an antiseptic, antipyretic etc.

*Example No. 49.*—In a solution of 15 gms. of procaine hydrochloride in 10 cc. of water, 2 gms. of sulfanilic acid are dissolved and then 5 gms. of procaine base may be stirred in and dissolved to form procaine sulfanilate, with some base in excess.

*Example No. 50.*—In 15 gms. of procaine hydrochloride dissolved in 10 cc. of water. 1 gm. of sulfapyridine may be dissolved by heating (normal solubility 1 gm. to 3500 cc. of water).

*Example No. 51.*—3 gms. of sulfathiazole are dissolved in a solution of 15 gms. of procaine hydrochloride in 10 cc. of water. Solution takes place easily.

*Example No. 52.*—10 gms. of delta-glucono lactone are dissolved in 10 cc. of water and 13 gms. of procaine base, added in, while heating and stirring until solution has taken place. 1 gm. of sulfapyridine is added and the solution warmed and stirred until the sulfapyridine has dissolved.

*Example No. 53.*—2 gms. of sulfapyridine are dissolved in 19.6 gms. of procaine levulinate dissolved in 10 cc. of water, by warming and stirring until the sulfapyridine has dissolved. Solution remains clear for hours and the entire solution appears like an emulsion on the next day.

*Example No. 54.*—Similarly, sulfathiazole may be dissolved in the above cited procaine salts of Examples 52 and 53, respectively, the sulfathiazole dissolving more readily than the sulfapyridine.

*Example No. 55.*—6.4 gms. of levulinic acid plus 13 gms. of procaine base, dissolved in 10 cc. of H₂O and 2 gms. of sulfapyridine stirred in until dissolved. The sulfapyridine dissolves not quite as readily as the sulfathiazole, and it requires somewhat longer for it to go into solution.

*Example No. 56.*—Dissolve in 25 cc. of glycerine containing 1.9612 gm. of H₃PO₄ (2.307 gm. of 85% strength, Sp. Gr. 1.710 or 1.314 cc. of) 9.44 gm. of procaine base, which makes it a dimolecular combination of procaine base to one of H₃PO₄. 1 gm. of benzocaine may then be dissolved in this solution.

*Example No. 57.*—In 20 cc. of H₂O 4.903 gms. of H₃PO₄ (5.77 gms. of the 85% H₃PO₄, or 3.37 cc.) and 11.8 gms. of procaine base may be dissolved. When solution has taken place 1 gm. of sulfanilamide and 0.5 gm. of benzocaine may be dissolved in it. While the sulfanilamide probably combined with the excess available acidity of the solution, thereby becoming more soluble, the 0.5 gm. benzocaine dissolved because of the presence of the acid procaine phosphate.

In addition to the above enumerated substances, I also found that other useful therapeutic substances, used as analgesics in which the amino grouping is in the side chain and not nuclear, may be dissolved in solutions of procaine salts. An example of such a substance is salicylamide:

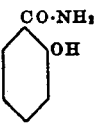

*Example No. 58.*—15 gms. of procaine hydrochloride are dissolved in 10 cc. of water and 1 gm. of salicylamide stirred in, producing a substantially stable solution.

It will be thus apparent from the foregoing that the present invention provides a method for obtaining a solution to a greater extent of a substance of the type enumerated in a specific solvent of the group enumerated in which such substance is insoluble or sparingly soluble, by first dissolving in that solvent a quantity of a procaine salt.

It will also be apparent that the greater the concentration of the procaine salt in the solvent, within the limitations of saturation and practicability, the greater the efficacy of the procaine salt solution as a solvent for the "insoluble" substance will be.

It will be further apparent that the nature of the acid to which the procaine of the solvent salt is linked is a material factor in the efficacy of its solution to dissolve the "insoluble" substance. Consequently, a solution of certain procaine salts of a specific concentration will be effective to dissolve a greater amount of the insoluble substance than the same concentration in solution of other salts of procaine. Also, a solution of such more solubilizing procaine salts will retain a specific quantity of the insoluble substance in solution for a longer period of time than a solution of the less solubilizing procaine salt.

It will be still further apparent that the dissolving of procaine base in a procaine salt solution, within practical limitations, improves the efficacy of such a solution as a solvent for an insoluble substance.

It will be further apparent that the effectiveness of any specific solution of a procaine salt as a solvent medium will also be determined by the nature of the insoluble substance to be dissolved in it, so that certain insoluble substances will dissolve more readily or remain longer in solution in any specific procaine salt solution, procaine base, for instance, than other insoluble substances would, as benzocaine, for instance.

The preparations of the present invention may be more or less easily formed, depending upon the nature of the procaine salt-solvent, the medium in which it is dissolved and upon the nature of the substance to be dissolved. As a general rule, the procaine salt is dissolved or formed first, in the solvent medium, water, glycerine, glycol or derivatives of glycol, generally by gentle or moderate heating, as on a water bath or low flame hot plate. The substance to be dissolved or its component substance are then added, and dissolved, generally by stirring while applying moderate heating, (about 125–140° F.).

It may here be stated that solutions in which the insoluble substance tends to precipitate a short time after formulation may be rendered more durable by boiling for a short while, thus causing greater molecular dispersion of the insoluble substance and retarding its precipitation.

It is to be understood that the preparations described in the various examples given above are presented as illustrations of the application of the principles of the present invention and represent preparations that are or might be medically desirable for the various purposes and uses mentioned herein. Of course, many other preparations and many variations of the preparations of the examples cited may readily be made for the same or other similar purposes or uses, as the need may arise, by anyone skilled in the art to which this invention relates.

As already explained in connection with certain of the examples given, it is true of all preparations that may be produced in accordance with the present invention, that such preparations may either be originally made up in the concentration in which they are intended to be used, or may be made up to be thereafter diluted to such concentration prior to actual use, or the ingredients may be mixed in powder or tablet form in the necessary proportions to be thereafter dissolved in the desired liquid medium. When the compounds named herein are of a balsamic nature, they cannot readily be reduced to powder or tablet form, but may be readily marketed in their concentrated form.

All of the preparations contemplated herein are preferably to be compounded with the addition of suitable anti-oxidants, in such proportions as will be readily understood by those skilled in the art, and any of the anti-oxidant substances or mixtures named in my aforesaid copending application or any others suitable for that purpose.

Such preparations may also readily be compounded by suitable admixture of a vaso-constrictor substance or substances, such as those enumerated in my said co-pending application and others suitable for the purpose.

It is to be understood that wherever the term "water-miscible," appears in the appended claims, it is intended to denote the characteristics of solubility as well as miscibility.

While I have illustrated the principles of the present invention with salts of the readily available and most commonly used procaine base as the solubilizing medium, it is to be understood that any readily soluble salt of an anesthetic ester could be utilized, including esters of amino benzoic acid in which the amino grouping is in a position other than the para, such as diethyl amino ethanol-meta-aminobenzoate, and anesthetic esters in which the aromatic nucleus is other than benzoic, such as diethyl amino-ethanol-para-amino cinnamate, and other esters of various amino alcohols and aromatic acids.

What I claim is:

1. A composition of matter comprising, a soluble procaine salt and a substance selected from the group consisting of alkyl esters of aminobenzoic acid and their salts, dissolved in a solvent from the group consisting of water, water-miscible poly-hydroxy aliphatic alcohols and their water-miscible ether derivatives, and their mixtures with one another in which the procaine salt is soluble, the said procaine salt constituting approximately 30 to 60 percent by weight to volume of the final volume of the solution and the said substance being present in an amount in excess of its normal solubility in the volume of solvent used.

2. A composition of matter comprising a salt of an alkamine ester of amino benzoic acid and a substance selected from the group consisting of alkyl esters of amino benzoic acid and their salts dissolved in a liquid selected from the group consisting of water, water-miscible poly-hydroxy aliphatic alcohols and their water-miscible ether derivatives, and their mixtures with one another, the said substance being present in an amount greater than its normal solubility in the volume of liquid used and the said alkamine ester salt being present in an amount sufficient to render such amount of the said substance soluble in the volume of the liquid used.

3. A composition of matter comprising a soluble salt of procaine and a substance selected from the group consisting of alkyl esters of amino benzoic acid and their salts, dissolved in a liquid selected from the group consisting of water, water-miscible poly-hydroxy aliphatic alcohols and their water-misicble ether derivatives, and their mixtures with one another, the said substance being present in an amount greater than its normal solubility in the volume of liquid used and the said procaine salt being present in an amount sufficient to render the amount of substance used soluble in the volume of liquid used.

4. A composition of matter comprising, an organic acid salt of procaine and a substance selected from the group consisting of alkyl esters of amino benzoic acid and their salts, dissolved in a liquid selected from the group consisting of water, water-miscible poly-hydroxy aliphatic alcohols and their water-miscible ether derivatives, and their mixtures with one another, the said substance being present in an amount greater than its normal solubility in the volume of liquid used and the said procaine salt being present in an amount sufficient to render such amount of substance soluble in the volume of liquid used.

5. A composition of matter comprising, a salt of procaine and a weakly dissociating acid and a substance selected from the group consisting of alkyl esters of amino benzoic acid and their salts, dissolved in a liquid selected from the group consisting of water, water-miscible poly-hydroxy aliphatic alcohols and their water-miscible ether derivatives, and their mixtures with one another, the said substance being present in an amount greater than its normal solubility in the volume of liquid used and the said procaine salt being present in an amount sufficient to render such amount of substance soluble in the volume of liquid used.

6. A composition of matter comprising, procaine levulinate and a substance selected from the group consisting of alkyl esters of amino benzoic acid and their salts, dissolved in a liquid selected from the group consisting of water, water-miscible poly-hydroxy aliphatic alcohols and their water-miscible ether derivatives, and their mixtures with one another, the said substance being present in an amount greater than its normal solubility in the volume of solvent used and the said procaine salt being present in an amount sufficient to render such amount of substance soluble in the volume of solvent used.

7. A composition of matter comprising, procaine mannitol-borate and a substance selected from the group consisting of alkyl esters of amino benzoic acid and their salts, dissolved in a liquid selected from the group consisting of water, water-miscible poly-hydroxy aliphatic alcohols and their water-miscible ether derivatives, and their mixtures with one another, the said substance being present in an amount greater than its normal solubility in the volume of liquid used and the said procaine salt being present in an amount sufficient to render such amount of substance soluble in the volume of liquid used.

8. A composition of matter comprising a solution consisting of a liquid selected from the group consisting of water, water-miscible poly-hydroxy aliphatic alcohols and their water-miscible ether derivatives and their mixtures with one another, in which benzocaine is normally of limited solubility and containing, in solution, approximately, by weight, 50% to 60% of procaine levulinate, 12% of procaine base and from 5% to 10% of benzocaine base.

9. A composition of matter comprising, a liquid selected from the group consisting of water, water-miscible poly-hydroxy aliphatic alcohols and their water-miscible ether derivatives, in which benzocaine is normally of limited solubility and containing, in solution, approximately, by weight, 50% of procaine levulinate; 12% of procaine base, and from 5% to 10% of benzocaine base, epinephrine salt in concentration of from 1:30,000 to 1:60,000 (as base), 0.05% to 0.1% of benzaldehyde sodium bisulphate and 0.1% to 0.2% of sodium thiosulphate.

10. A composition of matter comprising a condensation product of mannitol-boric acid and procaine base, the procaine base and the boric acid in the condensation product being present in the proportion of one molecular equivalent of procaine base to two molecular equivalents of boric acid, and a substance selected from the group consisting of alkyl esters of amino benzoic acid and their salts, dissolved in a liquid consisting of a mixture of propylene glycol and water in the proportion of 2:3, the said condensation product comprising approximately 40% by weight and the said substance comprising approximately 2% by weight, of the final solution.

11. A composition of matter, in solid form, containing a salt of procaine and a substance from the group consisting of alkyl esters of amino benzoic acid and their salts, in proportion that when dissolved in a volume of liquid selected from the group consisting of water, water-miscible poly-hydroxy aliphatic alcohols and their water-miscible ether derivatives, and their mixtures with one another, in which said substance is normally of limited solubility, to form at least a 30% solution of the procaine salt, the said substance will go into solution in an amount greater than its normal solubility in the solvent used.

12. A composition of matter, in solid form, containing a soluble salt of procaine, procaine base and a substance selected from the group consisting of alkyl esters of amino benzoic acid and their salts, in proportion that when dissolved in a liquid selected from the group of water, water-miscible poly-hydroxy aliphatic alcohols and their water-miscible ether derivatives, and their mixtures with one another, in which the substance is of limited solubility, to form a solution of at least 30% concentration of the procaine salt, the procaine base and said substance will go into solution in amounts greater than their normal solubility in the solvent used.

DAVID CURTIS.